Jan. 6, 1959     A. S. DECARIE     2,867,799
DISTRESS SIGNAL FOR AEROPLANES
Filed Dec. 24, 1956
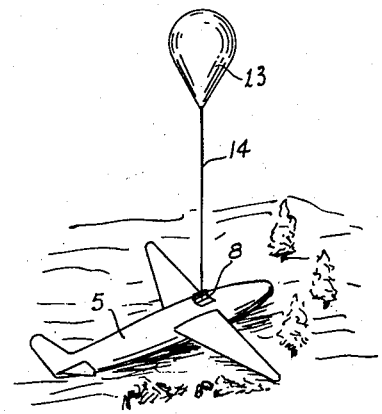
Fig. 1
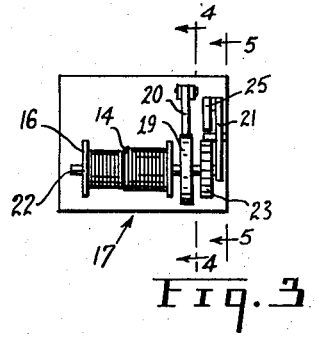
Fig. 3
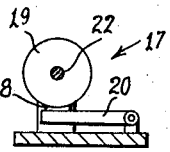
Fig. 4
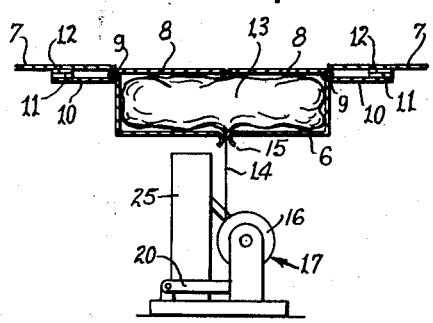
Fig. 2
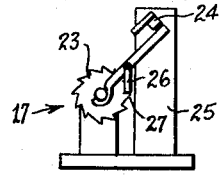
Fig. 5
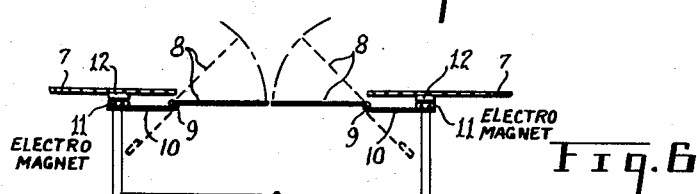
Fig. 6
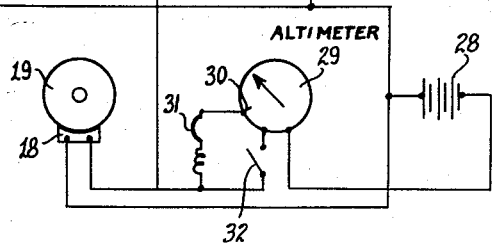
INVENTOR
A. S. DECARIE
By Fetherstonhaugh & Co.
Attorneys

2,867,799

DISTRESS SIGNAL FOR AEROPLANES

Alexander S. Decarie, Montreal, Quebec, Canada

Application December 24, 1956, Serial No. 630,390

4 Claims. (Cl. 340—366)

This invention relates to improvements in distress signals for aircraft and particularly to signals permanently attached to the aircraft by a cable, the signals being releasable from the aircraft and floating upwards above the aircraft after a crash or emergency landing.

The invention consists essentially in confining an inflated balloon within a compartment within the hull of an aircraft, the ballon being attached to the end of a cable wound on a drum, the compartment confining the balloon being closed to the outside of the aircraft by doors held shut magnetically. An electrical circuit controls the operation of the device whereby the magnetically held doors are opened and the cable holding the balloon is allowed to payout when the aircraft drops below a predetermined altitude, the electrical circuit being provided with a control switch operable manually by the pilot of the aircraft to prevent operation of the device when the aircraft is descending in a normal manner.

The object of the invention is to provide a visible signal device for downed aircraft which will operate automatically on a crash and will remain attached to the aircraft but at a height discernable above ground obstructions such as trees, heavy snow or water.

These and other objects will be apparent from the following specification and the accompanying drawings, in which:

Fig. 1 is a bird's eye view of the landscape of rough terrain on which an aircraft has been forced landed and showing a signal balloon released from the aircraft.

Fig. 2 is a partial section of the aircraft fuselage showing the signal balloon confined on the inside of the fuselage and the windlass to which the balloon is attached by means of a light cable.

Fig. 3 is a plan view of the windlass shown in Fig. 2.

Fig. 4 is a vertical cross section on the line 4—4 of Fig. 3 showing the magnetically held flywheel.

Fig. 5 is a vertical cross section on the line 5—5 of Fig. 3 showing the starting lever assembly.

Fig. 6 is a wiring diagram showing the electrical connections to the various magnetic pads.

Referring to the drawings, the aircraft 5 is fitted with a blister 6 on the inner surface of its fuselage 7. This blister 6 is located at any convenient position on the top surface of the fuselage and is provided with a pair of doors 8 hinged at 9. Each door is provided with an extension arm 10 terminating in a magnetic pad 11 adapted, when energized, to fasten magnetically to the pads 12 on the inside surface of the aircraft fuselage 7.

The blister 6 houses an inflated balloon 13 which is attached to one end of the cable 14. The cable 14 passes through a suitable outlet 15 in the blister 6 and has its other end secured to the drum 16 of the windlass 17, located in any convenient part of the aircraft but preferably close to the blister 6 where there will be the least resistance to the payout of the cable 14.

The drum 16 of the windlass 17 is free running in its bearings and is held against rotation by the magnetic pad 18 bearing against the flywheel 19. The magnetic pad 18 is mounted on the end of the pivoted arm 20, the pivoted arm being free to drop and carry the magnetic pad 18 clear of the flywheel 19 when current to the pad is cut off.

In order to start the windlass unwinding when current is cut off from the magnetic pad 18 and to overcome inherent friction, a weighted starting lever 21 is freely pivoted about the windlass shaft 22 to one side of the toothed wheel 23 at one end while the other end is held in a raised position by the magnetic pad 24 mounted on the bracket 25. A dog 26 is freely suspended from the starting lever 21 and has its lower end engaging with one of the teeth 27 of the wheel 23. When current is cut off from the magnetic pad 24 the weighted lever 21 falls and, through the dog 26 starts rotation of the windlass 17 in an unwinding direction.

In the wiring diagram shown in Fig. 6 a battery 28 supplies current to the magnetic pads 11 holding the doors 8 in the closed position and to the magnet pad 18 holding the windlass against unwinding. The current from the battery 28 is also passed through the altimeter 29. A contact 30 on the altimeter is set to trip the circuit breaker 31 when the altimeter indicates a predetermined low altitude. A manually operated switch 32 maintains the circuit through the altimeter 29 when the plane is in normal flight and making normal landings.

In the operation of this device, the switch 32 is normally kept closed by the pilot of the aircraft and, with the circuit breaker 31 closed current is supplied to the magnetic pads 11, 18 and 24 thereby holding the doors 8 closed and the windlass against unwinding. Once the aircraft has risen above the height as set on the altimeter 29, the pilot will retrip the manually operated switch 32. This will place the system in condition for automatic operation. Thereafter the electrical circuit is controlled automatically by the altimeter 29 which will maintain the current to the magnetic pads 11, 18 and 24 until the reading drops to a predetermined value indicated by the contact 31. Current to the magnetic pads 11, 18 and 24 is now cut off and the doors 8 will open at the same time as the flywheel 19 and the starting lever 21 is released. The weight of the starting lever acting through the dog 26 starts the unwinding of the windlass 17 against any inherent friction so that the balloon 13 will rise out through the doors 8 until the whole of the cable 14 is unwound from the windlass. The length of the cable 14 is sufficiently long as to allow the balloon to rise above any normal obstructions which would tend to hide the downed aircraft from sight from the air or ground and give a ready indication of the location of the plane to searchers.

By the use of the magnetic pads controlling the doors confining the balloon in its cabinet, and the operation of the windlass, the balloon will be released under any circumstances involving a loss of electrical power should the pilot fail to open the manual switch 32.

What I claim is:

1. In a device of the character described comprising in combination, an aircraft fuselage, a compartment on the inner wall of said fuselage, a pair of hinged doors on the wall of said fuselage enclosing said compartment, said doors opening outwards from the fuselage and being held in the closed position by magnetic means, a captive balloon in said compartment, a windlass, a cable on said windlass having one end secured to said balloon, magnetic means holding said windlass from unwinding, an altimeter in said aircraft and an electrical circuit including a circuit breaker, controlled by said altimeter, energizing both said magnetic means, the said circuit breaker in said electrical circuit being opened when the said altimeter indicates a drop of said aircraft to a predetermined altitude thereby effecting release of said balloon from the aircraft.

2. In a device of the character described in claim 1 in which a manually operated switch bypasses the said circuit breaker during normal operation of the aircraft.

3. In a device of the character described in claim 1 in which a weighted starting lever is held upwards by magnetic means and starts the said windlass to unwind when the said electrical circuit is opened.

4. In a device of the character described in claim 3 in which the said starting lever is provided with a freely pivoted dog engaging a toothed wheel on said windlass.

References Cited in the file of this patent
UNITED STATES PATENTS

| | | |
|---|---|---|
| 1,836,495 | Paulson | Dec. 15, 1931 |
| 2,778,332 | Talbot | Jan. 22, 1957 |